US012315654B2

(12) United States Patent
Yang et al.

(10) Patent No.: US 12,315,654 B2
(45) Date of Patent: May 27, 2025

(54) CABLE PROCESSING DEVICE

(71) Applicants: Tyco Electronics (Shanghai) Co. Ltd, Shanghai (CN); TE Connectivity Services GmbH, Schaffhausen (CH)

(72) Inventors: An (Joshua) Yang, Shanghai (CN); Lvhai (Samuel) Hu, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 358 days.

(21) Appl. No.: 17/880,024

(22) Filed: Aug. 3, 2022

(65) Prior Publication Data

US 2023/0041336 A1 Feb. 9, 2023

(30) Foreign Application Priority Data

Aug. 3, 2021 (CN) ......................... 202121791620.3

(51) Int. Cl.

*H01B 13/00* (2006.01)
*B21F 1/02* (2006.01)
*H01R 43/28* (2006.01)

(52) U.S. Cl.

CPC ........... *H01B 13/0036* (2013.01); *B21F 1/02* (2013.01); *H01B 13/0003* (2013.01); *H01R 43/28* (2013.01)

(58) Field of Classification Search

CPC ........ B21F 1/02; B21F 1/023; H01B 13/0036; H01B 13/0003; H01R 43/28

See application file for complete search history.

(56) References Cited

U.S. PATENT DOCUMENTS

| | | | | | |
|---|---|---|---|---|---|
| 2,136,714 | A * | 11/1938 | Simons | B21F 1/02 | 72/183 |
| 2,711,818 | A * | 6/1955 | Ruttkay | H01R 43/28 | 226/166 |
| 3,579,823 | A * | 5/1971 | Gressitt | H01B 13/344 | 174/34 |
| 3,875,662 | A * | 4/1975 | Folk | H01R 43/052 | 29/863 |
| 4,117,585 | A * | 10/1978 | Smith | H01R 43/01 | 140/140 |
| 4,183,383 | A * | 1/1980 | Gudmestad | H01R 43/28 | 29/562 |
| 4,196,510 | A * | 4/1980 | Gudmestad | H01R 43/28 | 29/33 M |
| 4,370,786 | A * | 2/1983 | Butler | H01R 43/28 | 29/33 F |

(Continued)

FOREIGN PATENT DOCUMENTS

| | | | | |
|---|---|---|---|---|
| CN | 111370975 A * | 7/2020 | | |
| DE | 20301985 U1 * | 4/2004 | | H01R 43/28 |

(Continued)

*Primary Examiner* — Jeffrey T Carley
(74) *Attorney, Agent, or Firm* — Barley Snyder

(57) ABSTRACT

A cable processing device includes a cable clamping device for clamping a cable to be processed. The device further includes a core wire straightening device for straightening exposed core wires of the fixed cable, and a core wire separating device for separating the straightened two core wires by a predetermined spacing.

18 Claims, 11 Drawing Sheets

(56) References Cited

U.S. PATENT DOCUMENTS

| | | | | |
|---|---|---|---|---|
| 10,475,558 | B2 * | 11/2019 | Dober | H01B 13/0235 |
| 10,727,638 | B2 * | 7/2020 | Fuchs | H01R 43/052 |
| 11,121,517 | B2 * | 9/2021 | Mabuchi | H01R 43/28 |
| 11,296,486 | B2 * | 4/2022 | Weaver | H01R 43/20 |
| 11,322,278 | B2 * | 5/2022 | Porter | H01R 43/0263 |
| 2006/0179908 | A1 * | 8/2006 | Braun | H01R 43/28<br>72/77 |
| 2019/0115734 | A1 * | 4/2019 | Weaver | B25B 5/003 |
| 2019/0356099 | A1 * | 11/2019 | Lo | H01R 43/0263 |
| 2020/0136334 | A1 * | 4/2020 | Mabuchi | H01R 43/28 |
| 2020/0321742 | A1 * | 10/2020 | Mabuchi | H01R 43/20 |

FOREIGN PATENT DOCUMENTS

| | | | | |
|---|---|---|---|---|
| DE | 102016003958 | A1 * | 10/2016 | H01R 43/28 |
| WO | WO-2018198711 | A1 * | 11/2018 | B21F 1/02 |

* cited by examiner

CABLE PROCESSING DEVICE

CROSS-REFERENCE TO RELATED APPLICATIONS

This application claims the benefit of Chinese Patent Application No. CN202121791620.3 filed on Aug. 3, 2021, the whole disclosure of which is incorporated herein by reference.

FIELD OF THE INVENTION

The present disclosure relates a cable processing device.

BACKGROUND

Before connecting a cable with two core wires wound together, the outer sheath at the end of the cable needs to be removed to expose the two core wires. After removing the sheath, it is necessary to straighten the exposed two core wires. Finally, the two straightened core wires are separated by a predetermined spacing. In this way, the subsequent connection operation of the core wires can be facilitated.

However, in the prior art, there is no cable processing equipment capable of performing the above operations, so the above processing operations need to be performed manually, and the processing efficiency of the core wires is very low.

SUMMARY

A cable processing device comprises a cable clamping device for clamping a cable to be processed. The device further includes a core wire straightening device for straightening a pair of exposed core wires of the fixed cable, and a core wire separating device for separating the straightened pair of core wires by a predetermined spacing.

BRIEF DESCRIPTION OF THE DRAWINGS

The invention will now be described by way of example with reference to the accompanying Figures, of which.

DETAILED DESCRIPTION OF THE EMBODIMENTS

Figure 1:
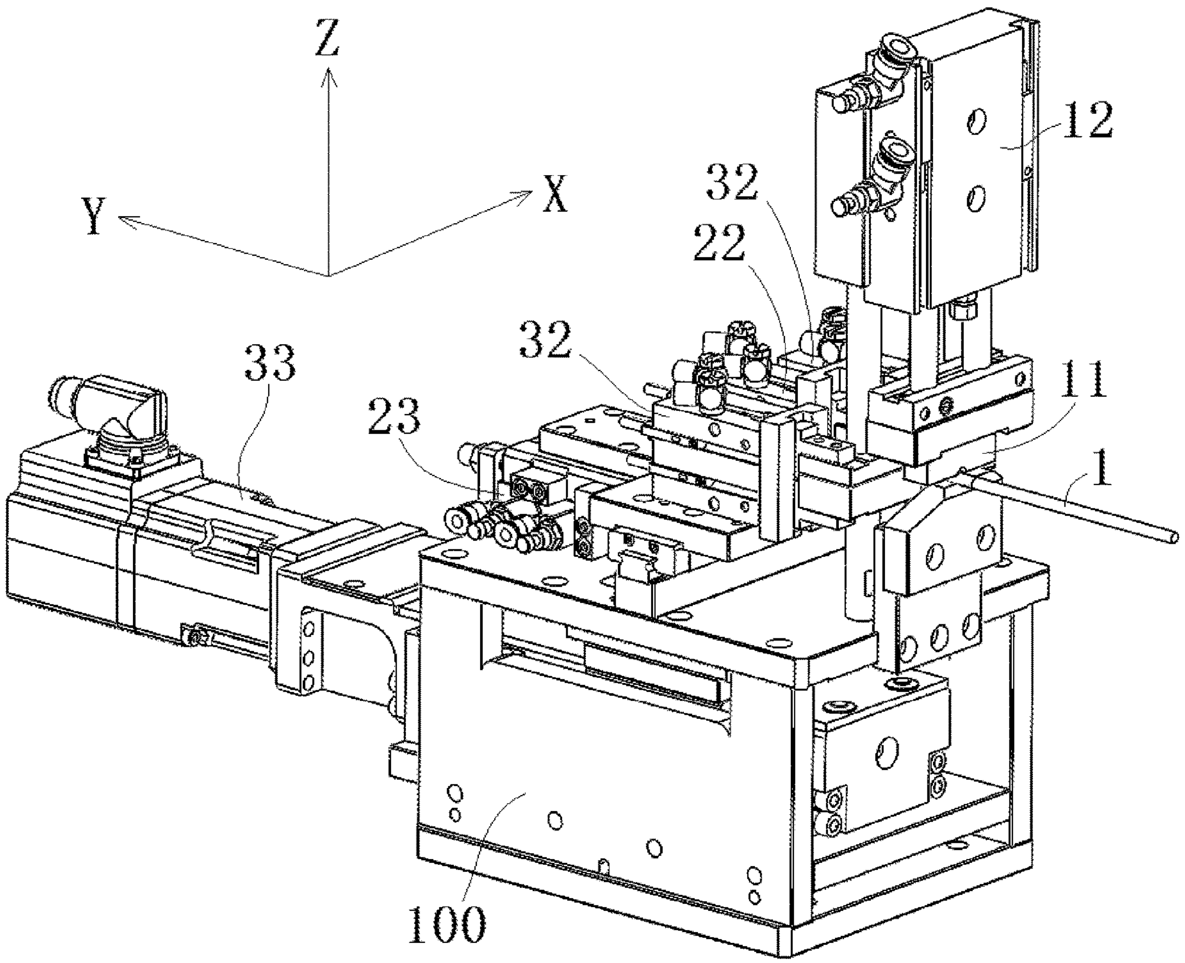
FIG. 1 shows a stereoscopic schematic view of a cable processing device viewed from the rear side according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a cable processing device. The device comprises a cable clamping device for clamping the cable to be processed, a core wire straightening device used to straighten a pair of exposed core wires of the fixed cable, and a core wire separating device. The wire separating device separates the pair of core wires that have been straightened by a predetermined spacing.

Figure 2:
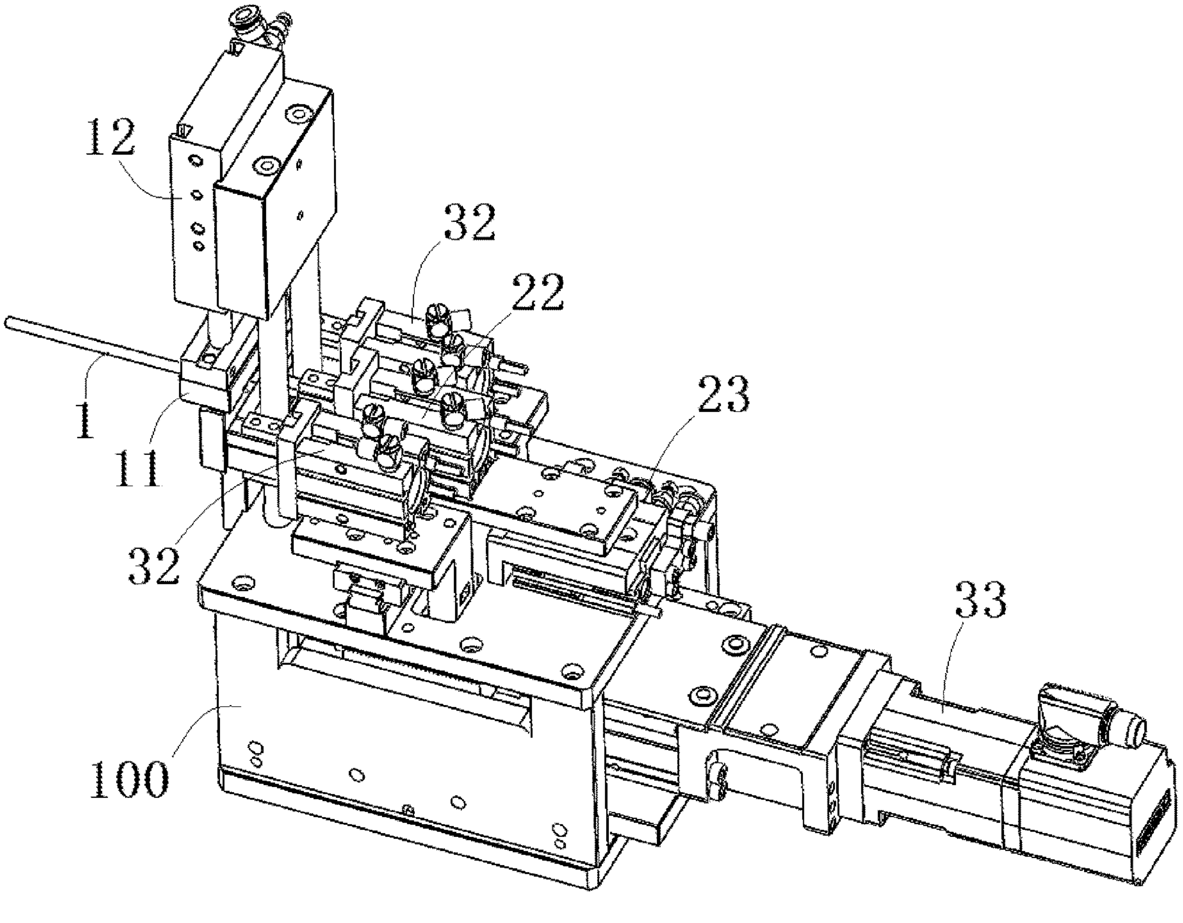
FIG. 2 shows a stereoscopic schematic view of a cable processing device viewed from the front side according to an exemplary embodiment of the present invention.
Figure 3:
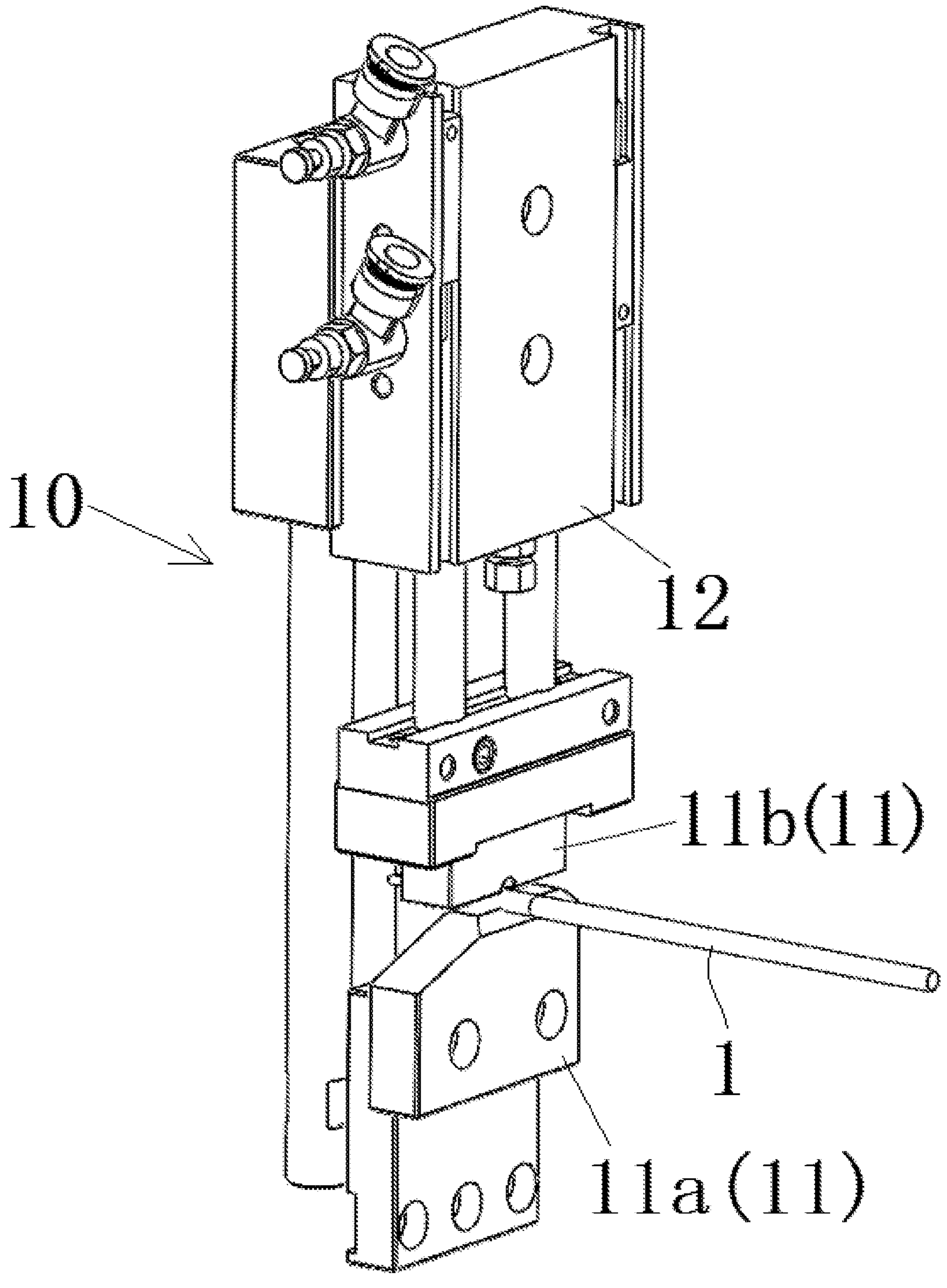
FIG. 3 shows a three-dimensional schematic diagram of the cable clamping device of the cable processing device shown in FIG. 1.
Figure 4:
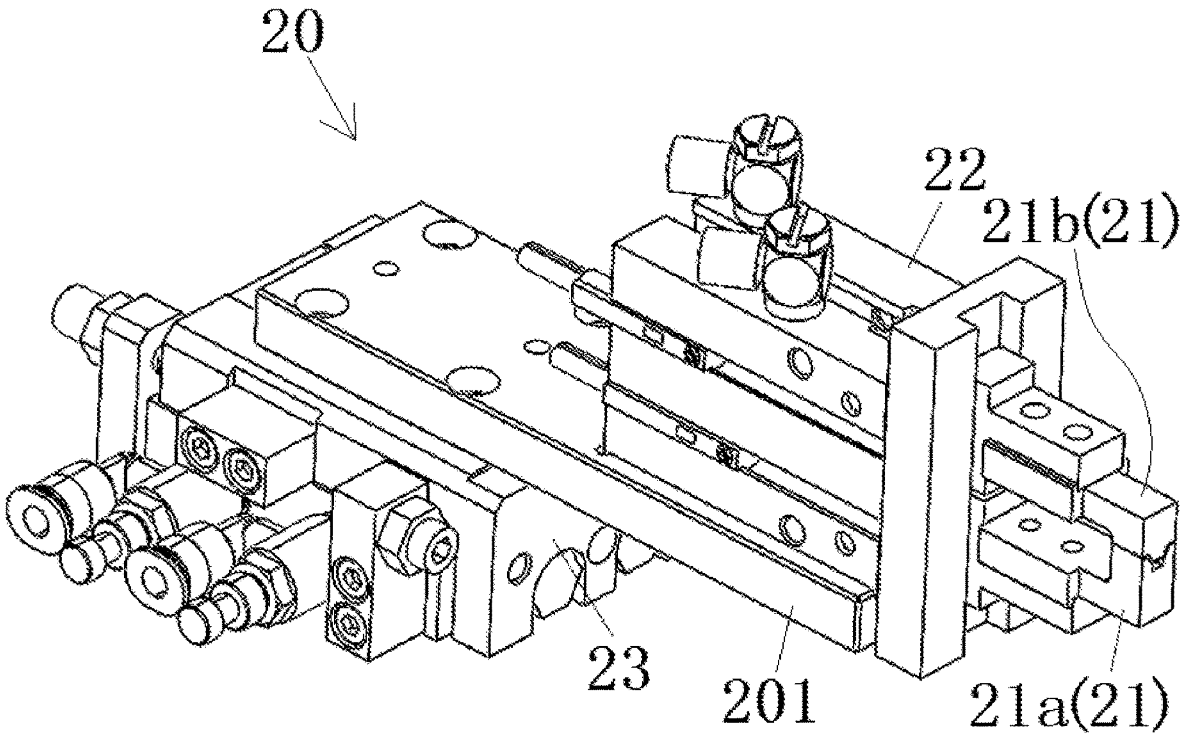
FIG. 4 shows a three-dimensional schematic diagram of the core wire straightening device of the cable processing device shown in FIG. 1.
Figure 5:
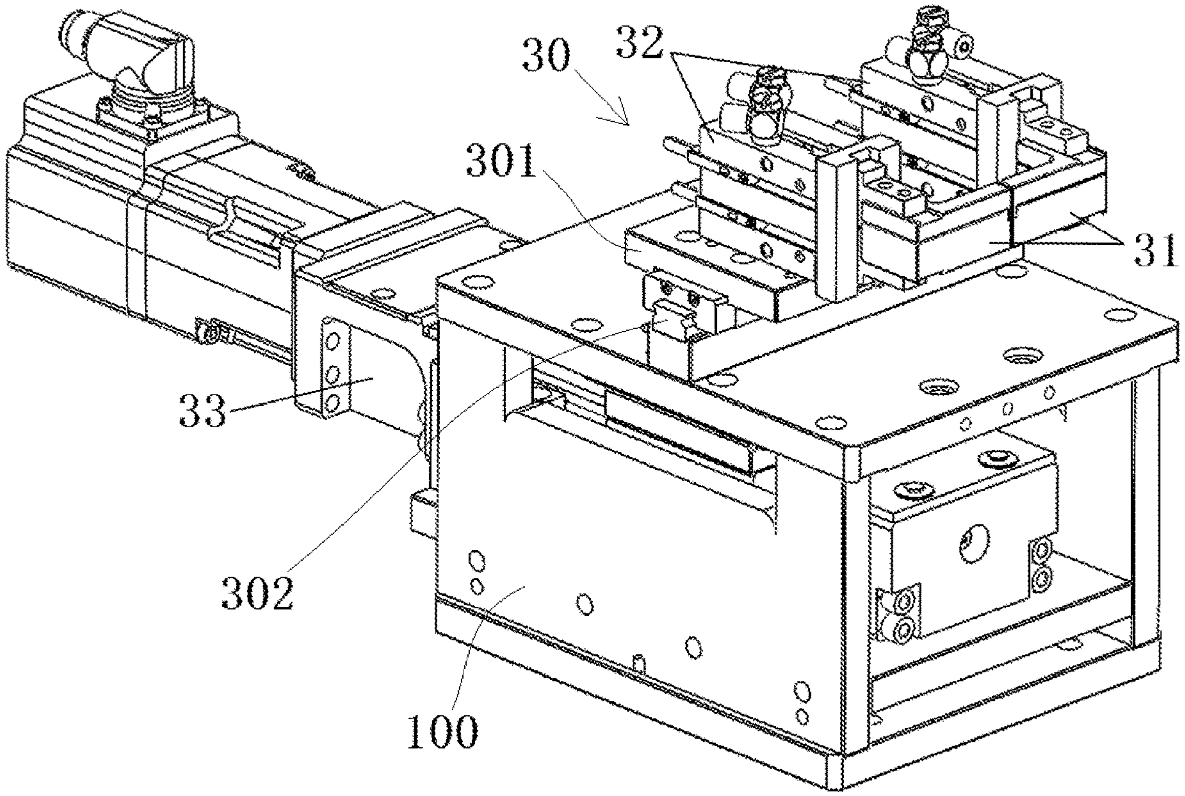
FIG. 5 shows a three-dimensional schematic diagram of the core wire separating device of the cable processing device shown in FIG. 1.

FIG. 1 is a schematic view of a cable processing device according to an exemplary embodiment of the present invention viewed from the rear side. FIG. 2 shows a stereoscopic schematic view of a cable processing device viewed from the front side according to an exemplary embodiment of the present invention. FIG. 3 shows a three-dimensional schematic diagram of the cable clamping device 10 of the cable processing device shown in FIG. 1. FIG. 4 shows a three-dimensional schematic diagram of the core wire straightening device 20 of the cable processing device shown in FIG. 1. FIG. 5 shows a three-dimensional schematic diagram of the core wire separating device 30 of the cable processing device shown in FIG. 1.

Referring generally to FIGS. 1-5, the cable processing device includes a cable clamping device 10, a core wire straightening device 20 and a core wire separating device 30. The cable clamping device 10 is used to clamp and fix the cable 1. The core wire straightening device 20 is used to straighten the exposed two core wires 1*a* of the fixed cable 1 (see FIG. 7*a*). The core wire separating device 30 is used to separate the two core wires 1*a* that have been straightened by a predetermined spacing (see FIG. 9*a*). The cable processing device further includes a frame 100. The cable clamping device 10, the core wire straightening device 20 and the core wire separating device 30 are installed on the frame 100.

The cable clamping device 10 includes a gripper 11 and a driving device 12. The gripper 11 is adapted to be opened and closed. The driving device 12 is used to drive the gripper 11 to open or close. When the gripper 11 is closed, the cable 1 is clamped on the gripper 11 so that the cable 1 is fixed. The gripper 11 includes a fixed block 11*a* and a movable block 11*b*. The fixed block 11*a* is fixed to the frame 100 of the cable processing device. The movable block 11*b* can be moved between an open position and a closed position with respect to the fixed block 11*a*. The driving device 12 includes, but is not limited to, a cylinder mounted on the frame 100 and connected to the movable block 11*b* to drive the movable block 11*b* to move between the open position and the closed position.

Figure 7:
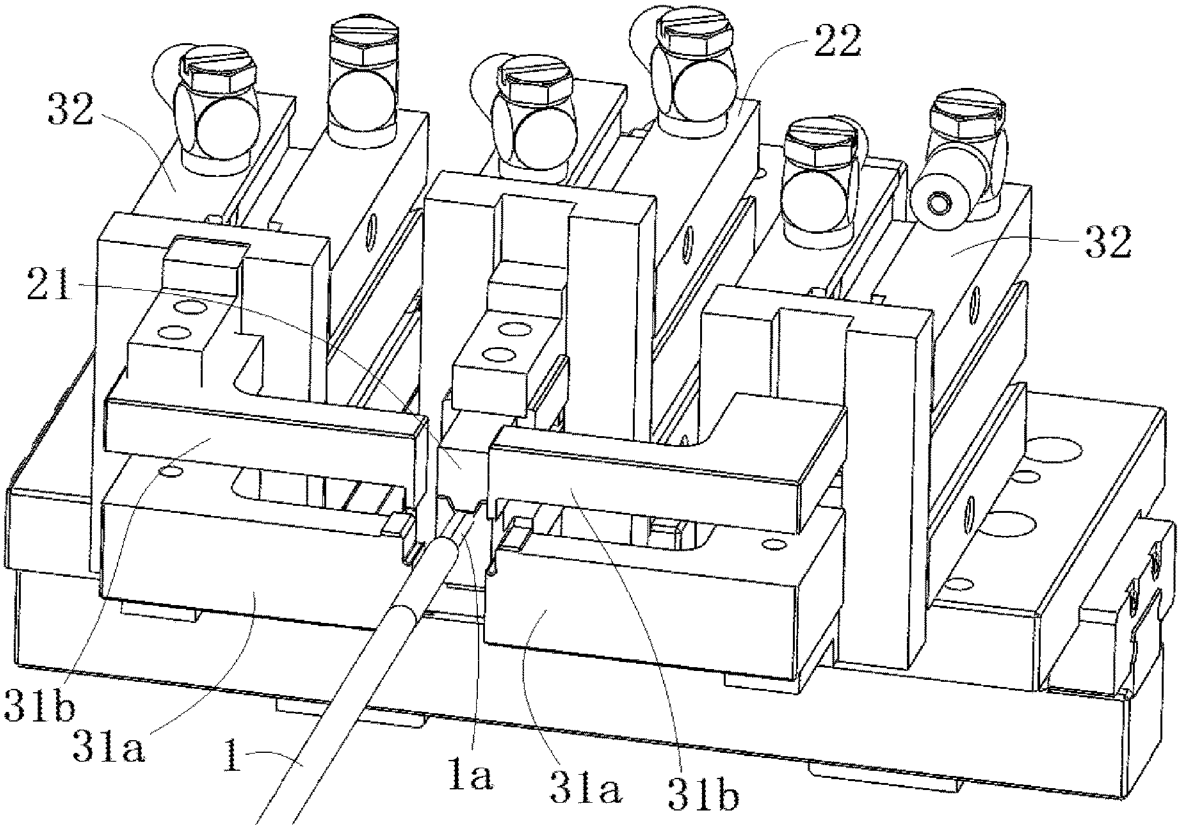
FIG. 7 shows the schematic diagram of straightening the core wire by using the core wire straightening device shown in FIG. 4.
Figure 7A:
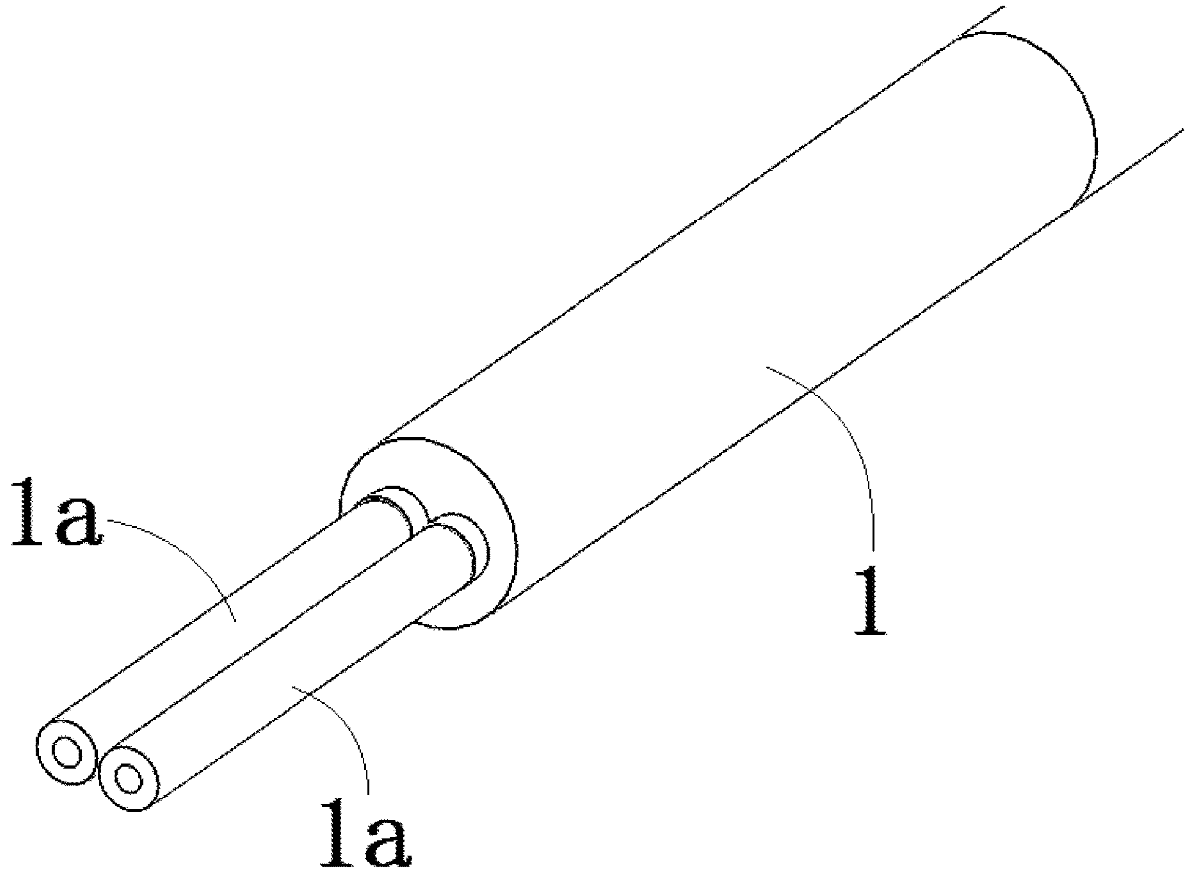
FIG. 7*a* shows the schematic diagram after the core wire of the cable is straightened.

FIG. 7 shows a schematic diagram of straightening the core wire 1*a* by using the core wire straightening device 20 shown in FIG. 4. FIG. 7*a* shows a schematic diagram after the core wires 1*a* of the cable 1 are straightened. As shown in FIGS. 1-2, 4, 7 and 7*a*, the core wire straightening device 20 includes a mounting frame 201, a clamp 21, a first driving device 22 and a second driving device 23. The mounting frame 201 is movably mounted on the frame 100 of the cable processing device and can be moved along the axis Y of the cable 1. The clamp 21 is mounted on the mounting frame 201 and is suitable to be opened and closed, and is used to clamp two core wires 1*a*. The first driving device 22 is mounted on the mounting frame 201 to drive the clamp 21 to open or close. The second driving device 23 is mounted on the frame 100 to drive the mounting frame 201 and the clamp 21 mounted thereon to move along the axial direction Y.

When the clamp 21 is closed, there is a gap between the clamp and the two core wires 1*a* to allow the clamp 21 to move in the axial direction Y of the cable 1 with respect to the two core wires 1*a*. In this way, it is possible to prevent abrasion of the two core wires 1*a* when the clamp 21 moves along the axial Y direction of the cable 1. After the clamp 21 is clamped on the roots or bases of the two core wires 1*a*, the second driving device 23 drives the clamp 21 to move to the ends of the two core wires 1*a* along the axial direction Y to straighten the two core wires 1*a*.

The clamp 21 includes a fixed clamping block 21*a* and a movable clamping block 21*b*. The fixed clamping block 21*a* is fixed to the mounting frame 201. The movable clamping block 21*b* is movably mounted on the mounting frame 201 and can be moved between the open position and the closed position with respect to the fixed clamping block 21*a*. The first driving device 22 includes a first cylinder connected to the movable clamping block 21*b* for driving the movable clamping block 21*b* to move between the open position and the closed position.

The second driving device 23 includes a second cylinder connected to the mounting frame 201 to drive the mounting frame 201 and the clamp 21 to move in the axial Y direction along the cable 1 with respect to the two core wires 1*a*.

Figure 6:
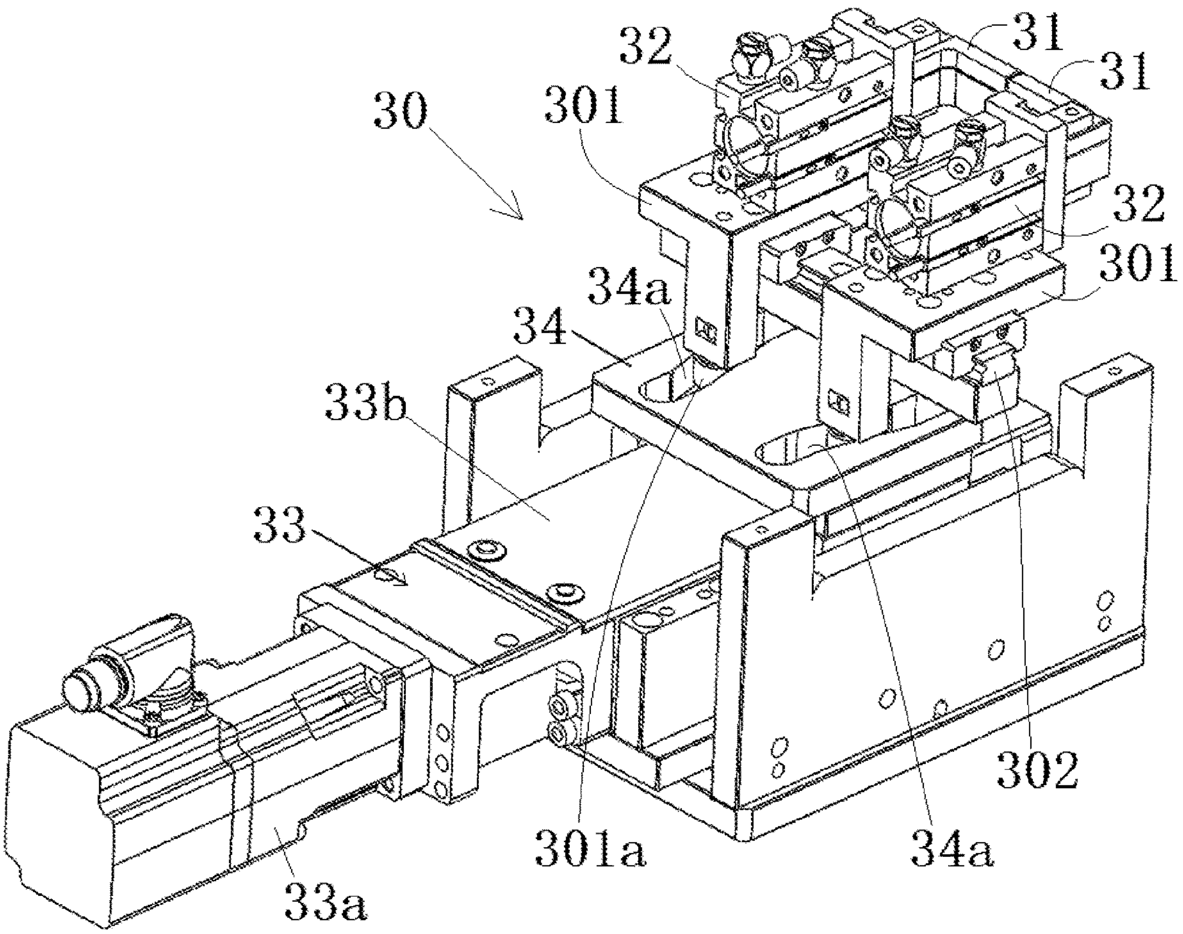
FIG. 6 shows a three-dimensional schematic diagram of the core wire separating device shown in FIG. 5.
Figure 8:
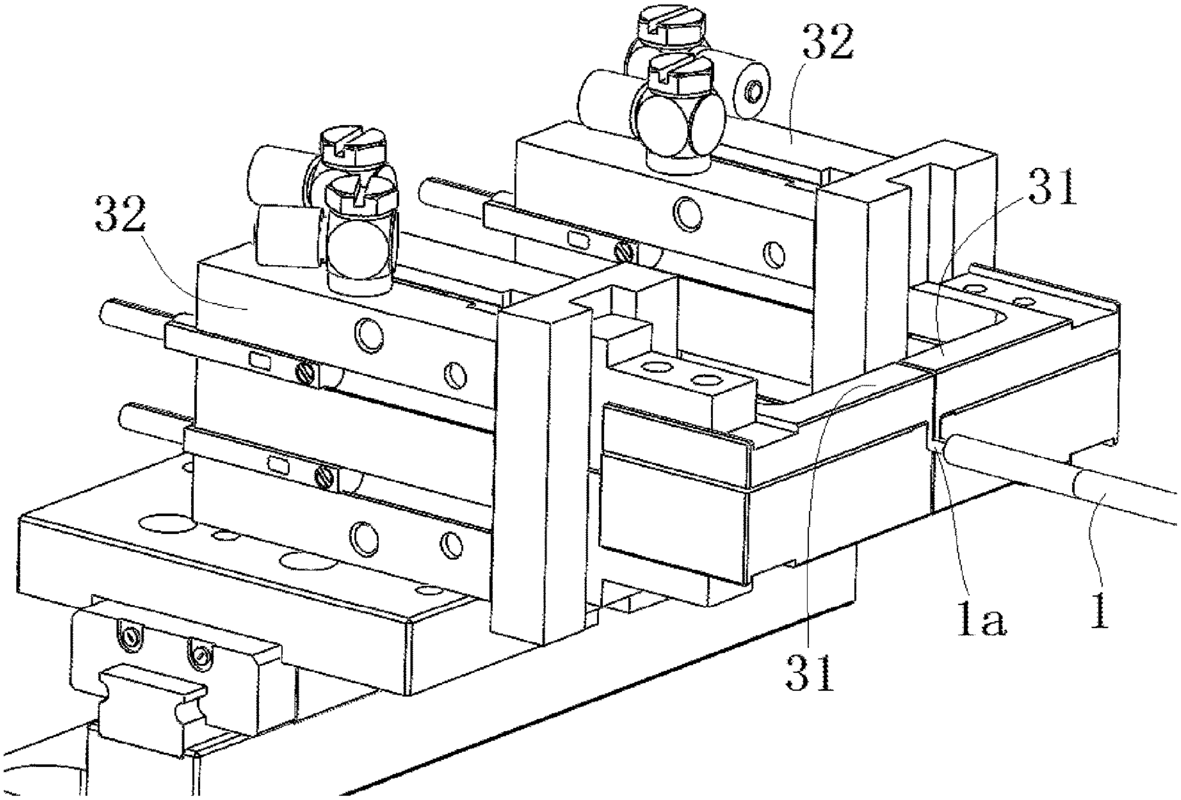
FIG. 8 shows the schematic diagram when the core wire separating device shown in FIG. 5 just clamps the core wire.
Figure 9:
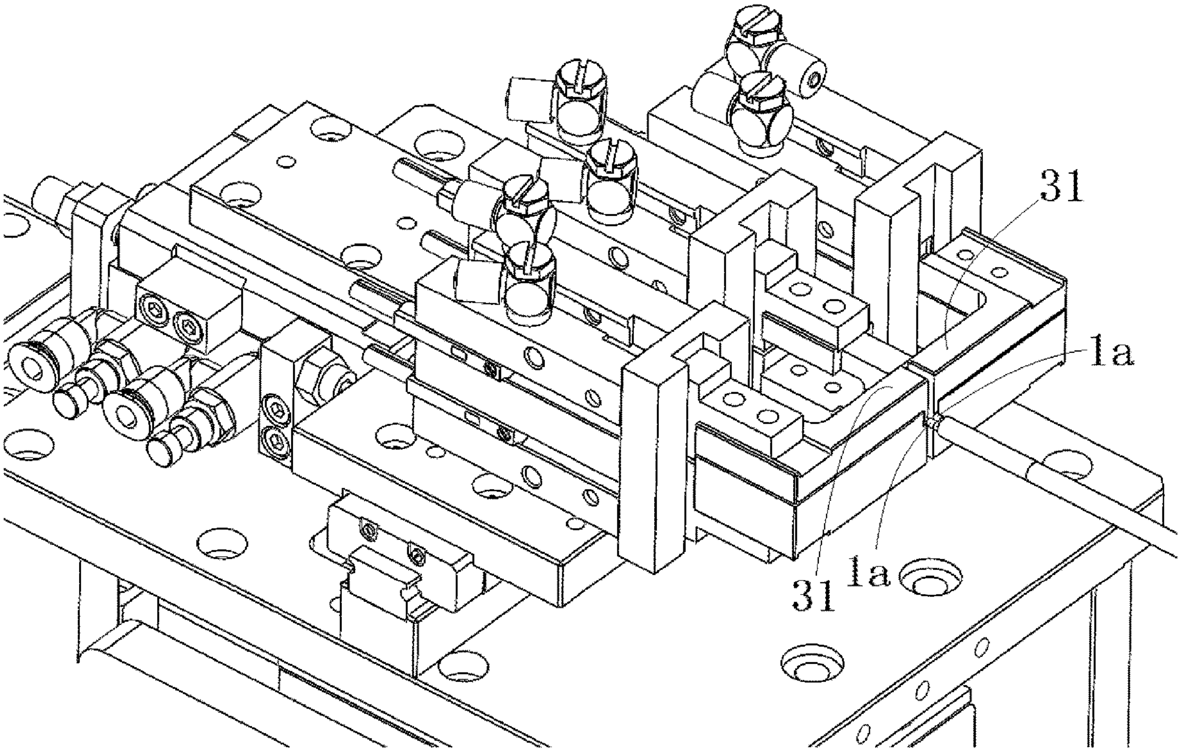
FIG. 9 shows a schematic diagram of using the core wire separating device shown in FIG. 8 to separate two core wires by a predetermined spacing.
Figure 9A:
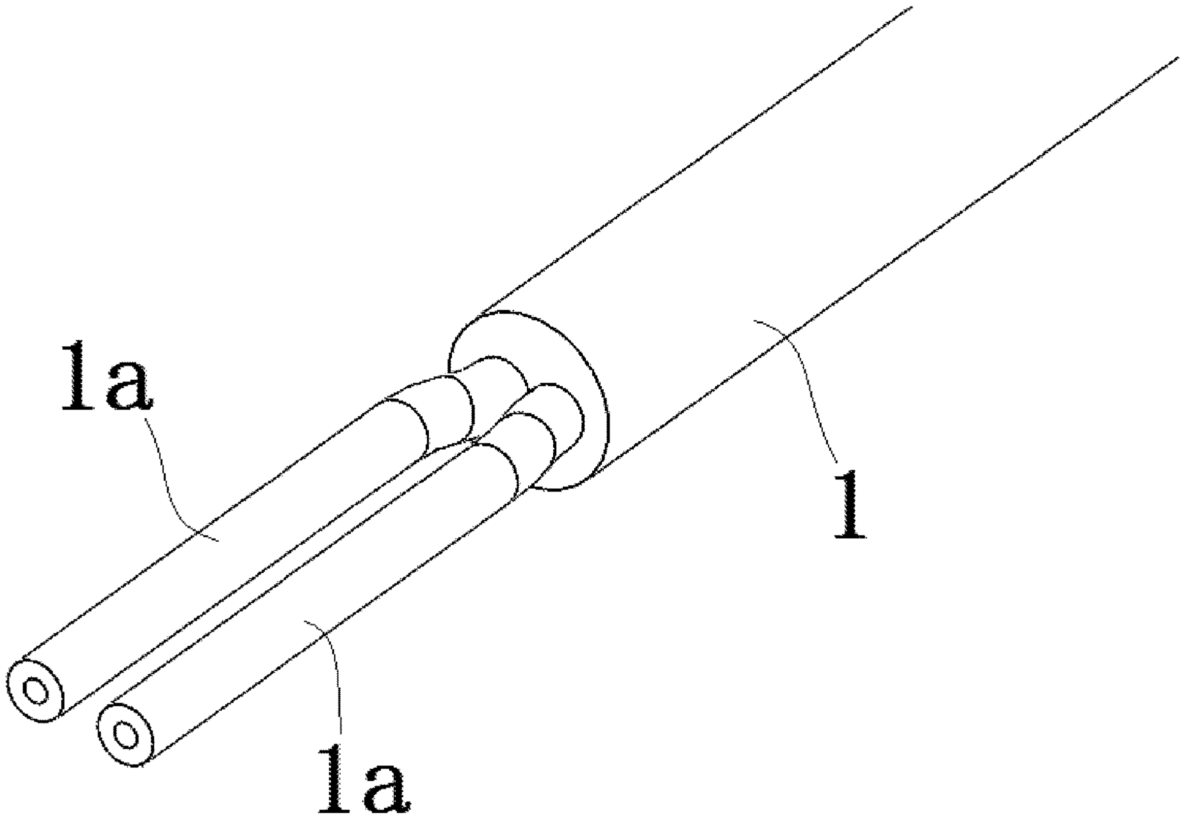
FIG. 9*a* shows a schematic diagram in which two core wires of a cable are separated by a predetermined spacing.

FIG. 6 shows a three-dimensional schematic diagram of the core wire separating device 30 shown in FIG. 5. FIG. 8 shows the schematic diagram when the core wire separating device 30 shown in FIG. 5 just holds the core wire 1*a*. FIG. 9 shows a schematic diagram of separating two core wires 1*a* by a predetermined spacing using the core wire separating device 30 shown in FIG. 8. FIG. 9*a* shows a schematic diagram in which the two core wires 1*a* of the cable 1 are separated by a predetermined spacing. Referring now to FIGS. 1-2, 5-6, 8, 9 and 9*a*, the core wire separating device 30 includes two support frames 301, two clamping devices 31, two first drive mechanisms 32 and a second drive mechanism 33 and 34. The two support frames 301 are movably mounted on the frame 100 of the cable processing device and can be moved in the first direction X perpendicular to the axis Y of the cable 1.

The two clamping devices 31 are respectively installed on the two support frames 301, which are suitable to be opened and closed, and are used to respectively clamp the two core wires 1*a* that have been straightened. The two first drive mechanisms 32 are respectively installed on the two support frames 301 to drive the two clamping devices 31 to open or close. The second drive mechanism 33 and 34 is installed on the frame 100 to drive the two support frames 301 to move away from or close to each other so that the two clamping devices 31 are moved away from or close to each other. After the two clamping devices 31 respectively clamp the two core wires 1*a*, the second driving mechanism 33 and 34 drives the two clamping devices 31 to move away from each other so that the two core wires 1*a* are separated by a predetermined spacing in the first direction X. The core wire separating device 30 also includes a slide rail 302. The slide rail 302 is mounted on the frame 100 and extends in the first direction X. The two support frames 301 are slidably mounted on the slide rail 302 so that they can be moved along the slide rail 302.

The second driving mechanism 33 and 34 includes a driving plate 34 and a linear driving device 33. A pair of slots 34*a* are formed on the driving plate 34. The linear driving device 33 is connected to the driving plate 34 for driving the driving plate 34 to move along the axis Y of the cable. The support frame 301 has legs 301*a*, and the legs 301*a* of the two support frames 301 are slidably assembled in the pair of slots 34*a* respectively. When the linear driving device 33 drives the driving plate 34 to move along the axial Y of the cable, the driving plate 34 drives the two support frames 301 to move away from or close to each other in the first direction X through the pair of slots 34*a*. The linear driving device 33 includes a servo motor 33*a* and a transmission mechanism 33*b*. The servo motor 33*a* is mounted on the frame 100. The transmission mechanism 33*b* is connected between the output shaft of the servo motor 33*a* and the driving plate 34. The transmission mechanism 33*b* is used to convert the rotary motion of the servo motor 33*a* into the linear motion of the driving plate 34.

The clamping device 31 includes a fixed clamping member 31*a* and a movable clamping member 31*b*. The fixed clamping member 31*a* is fixed to the support frame 301. The movable clamping member 31*b* is movably mounted on the support frame 301 and can be moved between an open position and a closed position with respect to the fixed clamping member 31*a*. The first drive mechanism 32 includes a driving cylinder connected to the movable clamping member 31*b* to drive the movable clamping member 31*b* to move between the open position and the closed position. The movable clamping member 31*b* is arranged to be able to move between the open position and the closed position in the second direction Z perpendicular to the axial direction Y of the cable 1 and the first direction X. The core wire straightening device 20 is arranged between two support frames 301 of the core wire separating device 30, and the two support frames 301 are symmetrically arranged on both sides of the core wire separating device 30.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable processing device, comprising:
- a cable clamping device adapted to clamp a cable;
- a core wire straightening device adapted to straighten a pair of exposed core wires of the clamped cable;
- a frame, the cable clamping device and the core wire straightening device mounted to the frame; and
- a core wire separating device adapted to separate the straightened pair of core wires from one another by a predetermined spacing, comprising:
  - two support frames movably mounted on the frame, the two support frames movable along a first direction perpendicular to the axial direction of the cable;
  - two clamping devices installed on respective ones of the two support frames, the clamping devices adapted to be selectively-opened and closed to clamp the straightened pair of core wires;
  - two first drive mechanisms installed on the respective ones of the two support frames and driving the two clamping devices to open and close respectively; and
  - a second driving mechanism installed on the frame and driving the two support frames for biasing the clamping devices relative to one another.

2. The cable processing device according to claim 1, wherein the core wire separating device is mounted to the frame.

3. The cable processing device according to claim 2, wherein the cable clamping device comprises:
- a gripper adapted to be opened and closed and clamp and fix the cable; and
- a driving device adapted to drive the gripper to open and close, the gripper adapted to clamp and fix the cable when closed.

4. The cable processing device according to claim 3, wherein the gripper comprises:
- a fixed block mounted to the frame; and
- a movable block movable between an open position and a closed position with respect to the fixed block.

5. The cable processing device according to claim 4, wherein the driving device includes a cylinder mounted on the frame and connected to the movable block and adapted to drive the movable block between the open position and the closed position.

6. The cable processing device according to claim 2, wherein the core wire straightening device comprises:
- a mounting frame movably mounted on the frame along an axial direction of the cable;
- a clamp mounted on the mounting frame and adapted to be opened and closed for clamping the two core wires;
- a first driving device mounted on the mounting frame and driving the clamp to open and close; and
- a second driving device mounted on the frame and adapted to drive the mounting frame and the clamp to move along the axial direction, wherein when the clamp is closed, a gap is defined between the clamp and the two core wires to allow the clamp to move along the axial direction.

7. The cable processing device according to claim 6, wherein the second driving device is adapted to drive the clamp to move to the ends of the two core wires along the axial direction to straighten the clamped pair of core wires.

8. The cable processing device according to claim 7, wherein the clamp comprises:
- a fixed clamping block fixedly mounted to the mounting frame; and
- a movable clamping block mounted on the mounting frame and movable between an open position and a closed position relative to the fixed clamping block.

9. The cable processing device according to claim 8, wherein the first driving device includes a cylinder mounted on the frame and connected to the movable block and driving the movable block between the open position and the closed position.

10. The cable processing device according to claim 9, wherein the second driving device comprises a second cylinder connected to the mounting frame and driving the mounting frame and the clamp along the axial direction with respect to the two core wires.

11. The cable processing device according to claim 1, wherein the second driving mechanism is adapted to drive the two clamping devices to move away from each other for separating the pair of core wires by the predetermined spacing in the first direction.

12. The cable processing device according to claim 1, wherein the core wire separating device further comprises a slide rail mounted on the frame and extending along the first direction, the two support frames slidably mounted on the slide rail.

13. The cable processing device according to claim 1, wherein the second drive mechanism comprises:
- a driving plate formed with a pair of slots; and
- a linear driving device connected to the driving plate and driving the driving plate to move along the axial direction of the cable, the two support frames having legs slidably assembled in the pair of slot respectively, wherein when the linear driving device drives the driving plate to move along the axial direction of the cable, the driving plate drives the two support frames to move relative to each other in the first direction through the pair of slots.

14. The cable processing device according to claim 13, wherein the linear driving device comprises:
- a servo motor mounted on the frame; and
- a transmission mechanism connected between an output shaft of the servo motor and the driving plate, the transmission mechanism converting a rotary motion of the servo motor into a linear motion of the driving plate.

15. The cable processing device according to claim 1, wherein the clamping device comprises:
- a fixed clamping member fixedly mounted to the support frame; and a movable clamping member movably mounted on the support frame and movable between an open position and a closed position with respect to the fixed clamping member.

16. The cable processing device according to claim 15, wherein the first drive mechanism comprises a driving cylinder connected to the movable clamping member and driving the movable clamping member to move between the open position and the closed position.

17. The cable processing device according to claim 15, wherein the movable clamping member is movable between an open position and a closed position in a second direction perpendicular to the axial direction of the cable and the first direction.

18. The cable processing device according to claim 1, wherein the core wire straightening device is arranged between two support frames of the core wire separating device, the two support frames arranged symmetrically on both sides of the core wire separating device.

* * * * *